(12) United States Patent
Nojima et al.

(10) Patent No.: US 11,788,971 B2
(45) Date of Patent: Oct. 17, 2023

(54) TEST KIT, TEST METHOD, DISPENSING DEVICE

(71) Applicant: Hitachi High-Technologies Corporation, Tokyo (JP)

(72) Inventors: Akihiro Nojima, Tokyo (JP); Takamichi Mori, Tokyo (JP); Isao Yamazaki, Tokyo (JP); Kohei Nonaka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 824 days.

(21) Appl. No.: 16/620,697

(22) PCT Filed: Apr. 10, 2018

(86) PCT No.: PCT/JP2018/015088
§ 371 (c)(1),
(2) Date: Dec. 9, 2019

(87) PCT Pub. No.: WO2018/230125
PCT Pub. Date: Dec. 20, 2018

(65) Prior Publication Data
US 2021/0140894 A1   May 13, 2021

(30) Foreign Application Priority Data

Jun. 14, 2017 (JP) ................. 2017-116957

(51) Int. Cl.
*G01N 35/00* (2006.01)
*G01N 35/10* (2006.01)
*G01N 21/82* (2006.01)

(52) U.S. Cl.
CPC ....... *G01N 21/82* (2013.01); *G01N 35/00623* (2013.01); *G01N 35/1004* (2013.01)

(58) Field of Classification Search
CPC .............. G01N 21/82; G01N 35/0062; G01N 35/1004; G01N 21/80; G01N 21/94; G01N 35/00623
(Continued)

(56) References Cited

U.S. PATENT DOCUMENTS

2002/0030009 A1\* 3/2002 Lin ................. G01N 33/54393
210/488
2004/0030104 A1\* 2/2004 Lipscombe .......... C07K 14/705
530/395
(Continued)

FOREIGN PATENT DOCUMENTS

JP   2007-205763 A   8/2007
JP   2008-191070 A   8/2008
(Continued)

OTHER PUBLICATIONS

English translation of JP4909599, Apr. 4, 2012. (Year: 2012).\*
(Continued)

*Primary Examiner* — Michael P Nghiem
(74) *Attorney, Agent, or Firm* — Crowell & Moring LLP (57) ABSTRACT

An object of the present invention is to provide a technology in which an amount of pigment carried from a pigment solution can be accurately measured at the time of testing a surface state of a dispensing probe on the basis of the amount of carried pigment. In a test method according to the present invention, a surface state of a dispensing probe is evaluated on the basis of an amount of pigment carried from an acidic pigment solution into a solution including no pigment.

10 Claims, 9 Drawing Sheets

(58) Field of Classification Search
USPC .......................................................... 702/30
See application file for complete search history.

(56) References Cited

U.S. PATENT DOCUMENTS

| | | | |
|---|---|---|---|
| 2010/0098589 | A1 | 4/2010 | Kubota |
| 2021/0318344 | A1* | 10/2021 | Nojima .............. G01N 35/1004 |

FOREIGN PATENT DOCUMENTS

| | | | |
|---|---|---|---|
| JP | 2008-202945 | A | 9/2008 |
| JP | 2009-174997 | A | 8/2009 |
| JP | 4892384 | B2 | 3/2012 |
| JP | 4909599 | B2 | 4/2012 |
| JP | 2012-220436 | A | 11/2012 |
| JP | 2014-167482 | A | 9/2014 |
| JP | 2014-219361 | A | 11/2014 |
| WO | WO 93/20444 | A1 | 10/1993 |

OTHER PUBLICATIONS

Supplementary Partial European Search Report issued in European Application No. 18818140.8 dated Mar. 19, 2021 (fifteen (15) pages).
Chinese-language Office Action issued in Chinese Application No. 201880034939.6 dated Jun. 1, 2023 (11 pages).
International Search Report (PCT/ISA/210) issued in PCT Application No. PCT/JP2018/015088 dated Jun. 19, 2018 with English translation (10 pages).
Japanese-language Written Opinion (PCT/ISA/237) issued in PCT Application No. PCT/JP2018/015088 dated Jun. 19, 2018 (10 pages).
"Papanicolaou", Aichi Committee for Clinical Laboratory Standardization, Jul. 2008, pp. 11-15 (six (6) pages).
"Pigment and Handling thereof", MERCK Ltd., obtained on Jun. 7, 2017 p. 19, http://www.aichi-amt.or.jp/labo/patho/reco/20090418 04.pdf, with English Translation (two (2) pages).

* cited by examiner

TEST KIT, TEST METHOD, DISPENSING DEVICE

TECHNICAL FIELD

The present invention relates to a technology of evaluating a surface state of a dispensing probe.

BACKGROUND ART

A clinical chemistry analysis is a test for analyzing components such as an inorganic ion, a protein, urea, sugars, a lipid, an enzyme, a hormone, a drug, a tumor marker, and the like, the components being in a biological sample such as blood, urine, or the like. An automatic analyzing device has been widely used for the clinical chemistry analysis. A dispensing probe of the automatic analyzing device is cleaned by a cleaning mechanism and repeatedly used, except for a case where a disposable tip is used as the dispensing probe which dispenses a sample.

In recent years, a reduction in an amount of specimen, and a highly sensitive analysis have been an important development trend for the automatic analyzing device. Accordingly, maintaining of a cleanliness of a surface of the dispensing probe at a high level has been required more than before, in terms of a reduction in variation of a suction amount and a discharge amount, and a reduction in contamination.

The following PTL 1 and PTL 2 each disclose a technology for maintaining a cleanliness of the surface of the dispensing probe. In these literatures, a cleaning acceleration mechanism such as an ultrasonic cleaner, a heater, or the like is used together with a general cleaning tank.

A test method of checking a cleanliness of the dispensing probe to evaluate an effect of cleaning the surface of the dispensing probe is described in the following PTL 3. According to the same literature, a pigment solution is dispensed by the dispensing probe and then a solution (for example, a saline solution) including no pigment is dispensed. In a case where the pigment is attached to the dispensing probe, the pigment is carried from the pigment solution into the solution including no pigment. The amount of carried pigment is calculated on the basis of an absorbance measured by a spectrophotometer. A state of the surface of the dispensing probe is estimated by using the amount of carried pigment.

The following NPL 1 describes characteristics of a pigment considered as being able to be generally used in, for example, a pigment carrying test in PTL 3.

CITATION LIST

Patent Literature

PTL 1: JP 4892384 B2
PTL 2: JP 2008-202945 A
PTL 3: JP 4909599 B2

Non-Patent Literature

NPL 1: "Pigment and Handling thereof", P. 19, MERCK Ltd. (URL: www.aichi-amt.or.jp, obtained on Jun. 7, 2017).

SUMMARY OF INVENTION

Technical Problem

In the test method based on the carrying of the pigment as described in PTL 3, since the amount of carried pigment is extremely small, an absorbance of the solution into which the pigment is carried may be near a lower limit of a detection range of the spectrophotometer.

The present invention has been made in view of the above problems, and provides a technology in which an amount of pigment carried from a pigment solution can be accurately measured at the time of testing a surface state of a dispensing probe on the basis of the amount of carried pigment.

Solution to Problem

In a test method according to the present invention, a surface state of a dispensing probe is evaluated on the basis of an amount of pigment carried from an acidic pigment solution into a solution including no pigment.

Advantageous Effects of Invention

By using the test method according to the present invention, it is possible to evaluate a surface state of the dispensing probe with a high reproducibility and a high reliability. As a result, it is possible to maintain a cleanliness of a surface of the dispensing probe at a high level, such that an analysis performance reliability can be improved.

BRIEF DESCRIPTION OF DRAWINGS

FIG. 10 is a view illustrating a configuration of a test kit 800 containing a solution or the like used to test a cleanliness of the sample dispensing probe 11a.

DESCRIPTION OF EMBODIMENTS

Embodiment 1: Device Configuration

Figure 1:
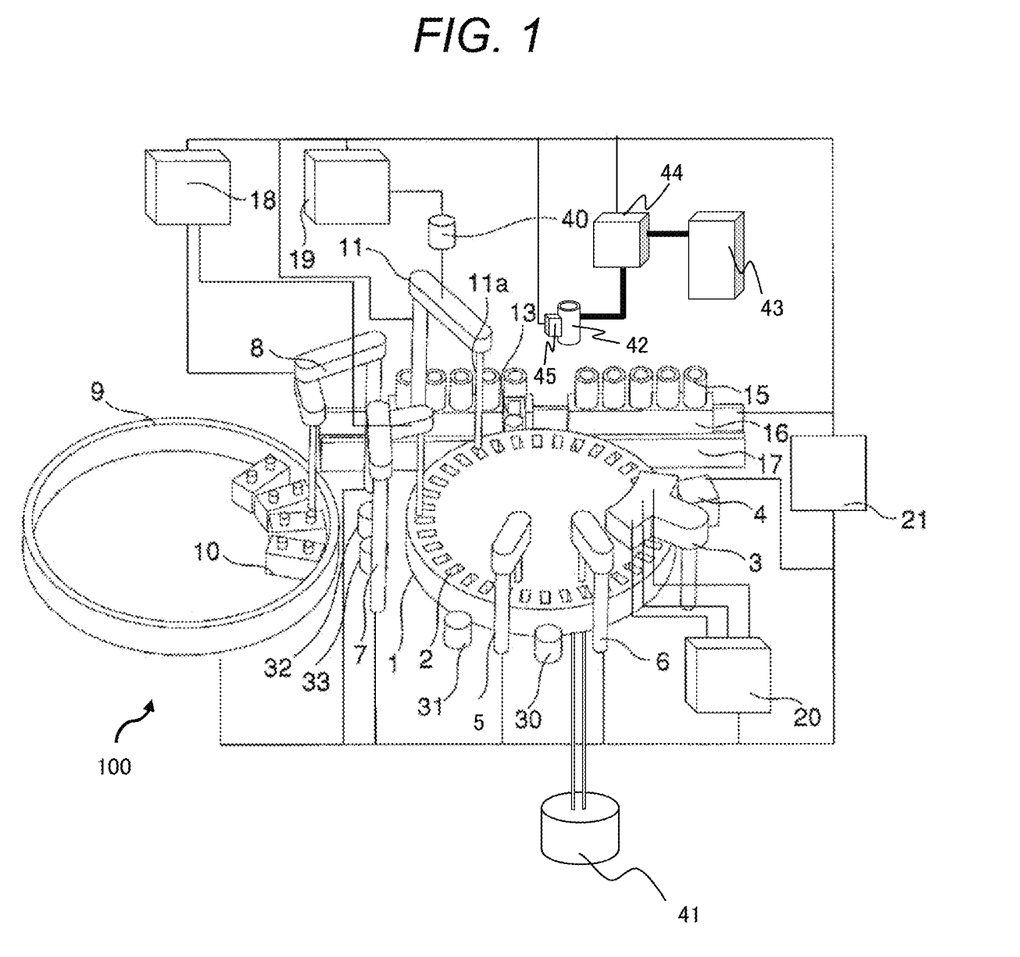
FIG. 1 is a schematic view of an automatic analyzing device 100 according to Embodiment 1.

FIG. 1 is a schematic view of an automatic analyzing device 100 according to Embodiment 1 of the present invention. Since functions of respective units thereof are known in the art, a detailed description thereof will be omitted. Reaction vessels 2 are arranged in a circumferential fashion on a reaction disk 1. A temperature of the reaction vessel 2 is maintained constant by a thermostat 41. A plurality of reagent bottles 10 can be placed in a circumferential fashion in a reagent disk 9. A sample conveying mechanism 17 which moves a rack 16 on which a sample container 15 is loaded is mounted near the reaction disk 1. Reagent dispensing mechanisms 7 and 8 are mounted between the reaction disk 1 and the reagent disk 9. A sample dispensing mechanism 11 which can rotate and vertically move is mounted between the reaction disk 1 and the sample conveying mechanism 17. The sample dispensing mechanism 11 includes a sample dispensing probe 11a. A sample syringe 19 is connected to the sample dispensing probe 11a. The sample dispensing probe 11a moves so as to describe an arc around a rotational axis to dispense a sample from the sample container 15 to the reaction vessel 2. A pressure sensor 40 detects a pressure of a flow path in the sample dispensing probe 11a.

A cleaning mechanism 3, a spectrophotometer 4, stirring mechanisms 5 and 6, and the like are disposed around the reaction disk 1. A cleaning pump 20 is connected to the cleaning mechanism 3. Cleaning tanks 33, 32, 13, 31, and 30 are disposed in operation ranges of the reagent dispensing mechanisms 7 and 8, the sample dispensing mechanism 11, and the stirring mechanisms 5 and 6, respectively. A reagent syringe 18 is connected to the reagent dispensing mechanisms 7 and 8. The sample container 15 contains a test sample such as blood or the like. The sample container 15 is loaded on the rack 16 and conveyed by the sample conveying mechanism 17.

The sample dispensing probe 11a is normally cleaned by using the cleaning tank 13. In order to particularly enhance an effectiveness of the cleaning, the sample dispensing probe 11a is cleaned by using a cleaning tank 42. A cleaning fluid is supplied from a cleaning fluid tank 43 to the cleaning tank 42 by a cleaning fluid syringe 44. A cleaning acceleration mechanism 45 is mounted on the cleaning tank 42, such that it is possible to clean the sample dispensing probe 11a more intensively, than a case of immersion in the cleaning fluid. Examples of the cleaning acceleration mechanism 45 include an ultrasonic cleaner, a heater, and the like. The respective mechanisms are controlled by a controller 21.

Embodiment 1: Test Procedure

When checking a surface state of the sample dispensing probe 11a, first, a pigment solution is prepared in the sample container 15. A pigment used here includes an acidic pigment such as orange G, eosin Y, light green, amido black, or the like. The acidic pigment is a pigment in which a large amount of ions are present at a pH higher than an acid dissociation constant (pKa) and a large amount of molecules are present at a pH lower than the pKa. The acidic pigment has a functional group such as a sulfo group, a phosphate group, or the like. That is, a substance with a lower pKa is present in a state in which it is charged as an ion even in a low pH environment. The pigment solution is prepared to be more acidic by various acids. The number of sample containers 15 into which the pigment solution prepared as described above is put may be plural, for example, three. Concentrations of the pigments in the respective sample containers 15 may be the same as one another or different from one another.

The reason for using the acidic pigment and the reason for keeping the pigment solution, in which the acidic pigment is dissolved, acidic are as follows. The acidic pigment tends to be negatively charged as an ion in an acidic environment as described above. Meanwhile, in a case of dispensing, for example, a blood sample, a protein in blood may adhere to the surface of the sample dispensing probe 11a, which causes contamination. When a protein molecule is exposed to an acidic solution, the protein molecule tends to be positively charged due to an influence of an H+ ion. Therefore, an acidic pigment molecule and the protein molecule electrically attract each other, such that the pigment is easily attached to the protein molecule. It is considered that it is possible to sufficiently secure an amount of carried pigment in a pigment carrying test. It is preferable that a pH of the pigment solution is about 2.0 to 6.0 as described later.

Next, a solution including no pigment, such as pure water, a saline solution, a phosphate buffer solution, or the like is prepared in another sample container 15. The number of sample containers 15 described above may also be plural, for example, three. In a case of preparing a plurality of solutions including no pigment, it is preferable that amounts of the plurality of solutions are equivalent to one another. This is because an absorbance varies depending on a volume of the solution including no pigment.

The sample containers 15 each containing the pigment solution or the solution including no pigment are loaded on the rack 16. The rack 16 is conveyed to a position at which dispensing can be performed by the sample dispensing mechanism 11, by using the sample conveying mechanism 17.

Next, the pigment solution in the sample container 15 is dispensed by the sample dispensing mechanism 11. An amount of pigment solution dispensed each time is, for example, 10 μL or the like. The pigment solution in the sample container 15 is sucked by the sample dispensing mechanism 11 and discharged into the reaction vessel 2, thereby completing one cycle of dispensing. The dispensing may be repeatedly performed multiple times. In this case, it is preferable not to use the same reaction vessel 2 into which the pigment solution is dispensed once. Since the present process is for making the pigment solution come into contact with the dispensing probe, a discharge destination of the pigment solution is not considered. For example, the pigment solution may be discharged into the cleaning tank 13 or 42, instead of the reaction vessel 2.

Next, the sample dispensing probe 11a dispensing the pigment solution is cleaned by the cleaning tank 13. To enhance an effectiveness of the cleaning, the sample dispensing probe 11a may be cleaned in the cleaning tank 42 more intensively by using the cleaning acceleration mechanism 45.

Next, the rack 16 is moved by using the sample conveying mechanism 17, and the solution including no pigment is dispensed by the sample dispensing mechanism 11. A dispensing procedure is similar to that in a case of dispensing the pigment solution. In a case where the pigment remains on a surface of the dispensing probe, the pigment is carried into the solution including no pigment by the dispensing. Such a dispensing may also be repeatedly performed multiple times.

The amount of pigment carried at this time can be defined by the following Equation 1. An absorbance of the solution into which the pigment is carried can be measured by the spectrophotometer 4. An absorbance of the pigment solution and an absorbance of the solution including no pigment can be measured by the spectrophotometer 4 or a result of measuring the absorbance of the pigment solution and the absorbance of the solution including no pigment in advance can be pre-stored in the controller 21. In a case of measuring the absorbance by the spectrophotometer 4, there is a need to prepare a solution including no pigment that is not used in the pigment carrying test to measure the absorbance. A concentration of the pigment solution and a volume of the solution into which the pigment is carried can be calculated based on a dispensed amount.

Amount (mass) of carried pigment=(Absorbance of solution into which pigment is carried−Absorbance of solution including no pigment)/(Absorbance of pigment solution−Absorbance of solution including no pigment)×Concentration of pigment solution×Volume of solution into which pigment is carried (1)

Since the higher the absorbance of the pigment solution is, the larger the amount of carried pigment becomes, it is possible to implement a high sensitivity. However, in a case where the absorbance of the pigment solution exceeds an upper limit of a measurement range of the spectrophotometer 4, it is difficult to directly measure the absorbance of the pigment solution. In this case, an absorbance of a solution obtained by diluting the pigment solution can be measured and a result of the measurement can be used to calculate the absorbance of the undiluted pigment solution by the following Equation 2.

Absorbance of undiluted pigment solution=(Absorbance of diluted solution−Absorbance of solution including no pigment)×Dilution ratio+Absorbance of solution including no pigment (2)

Figure 2:
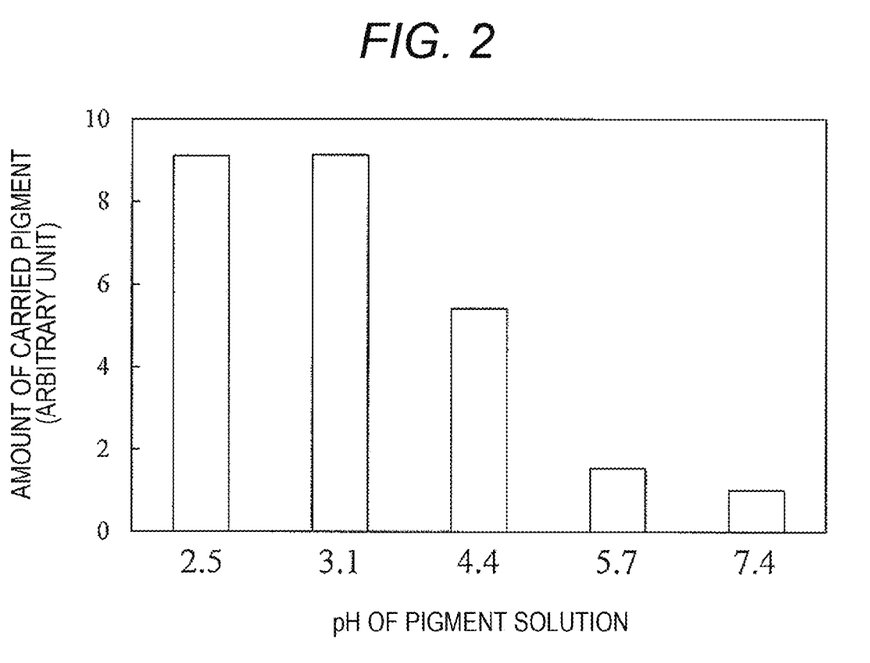
FIG. 2 is a graph illustrating a result of measuring a relationship between a pH of a pigment solution, and an amount of carried pigment.

FIG. 2 is a graph illustrating a result of measuring a relationship between a pH of the pigment solution, and an amount of carried pigment. For comparison, a vertical axis represents a value relative to a reference value, that is, 1. As illustrated in FIG. 2, it can be appreciated that the lower (acidic) the pH of the pigment solution is, the larger the amount of carried pigment becomes. The amount of carried pigment at a pH of 5.7 is about 1.5 times the amount of carried pigment at a pH of 7.4. The amount of carried pigment at a pH of 4.4 is about 5 times or more the amount of carried pigment at a pH of 7.4. The amount of carried pigment is further increased remarkably at a pH of 3 or lower, which is about 9 times the amount of carried pigment at a pH of 7.4. Up to a pH of about 2.0, a similar amount of carried pigment can be achieved, but the amount of carried pigment tends to be decreased at a pH of less than 2.0. According to the result illustrated in FIG. 2, it can be considered that the pH of the pigment solution is preferably about 2.0 to 6.0, which is acidic.

Embodiment 1: Conclusion

In the test method according to Embodiment 1, the pH of the pigment solution in which the acidic pigment is dissolved is acidic, such that it is possible to sufficiently secure the amount of carried pigment in the pigment carrying test. As a result, it is possible to more accurately determine the surface state of the dispensing probe.

Embodiment 2

An absorbance of each solution may be measured by using a spectrophotometer prepared separately from the automatic analyzing device 100. In this case, for example, after the test described in Embodiment 1 is performed, the sample container 15 for the solution into which the pigment is carried is unloaded from the rack 16. After stirring the solution into which the pigment is carried, the stirred solution is dispensed into a measurement cell of the separately prepared spectrophotometer by using a pipette or the like to measure an absorbance. An amount of carried pigment can be measured on the basis of the measured absorbance. Absorbances of an undiluted pigment solution, a diluted solution thereof, and a solution including no pigment can be measured by a similar method.

Embodiment 3

Figure 3:
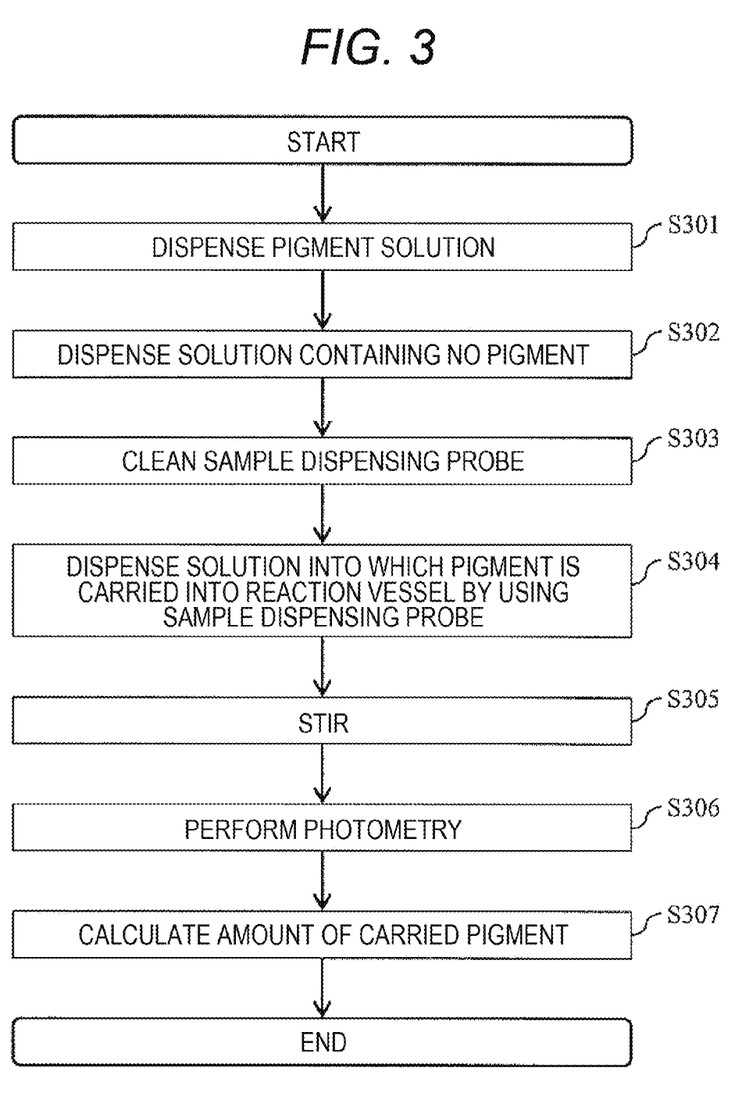
FIG. 3 is a flowchart for describing a procedure in which the automatic analyzing device 100 measures an absorbance of a solution into which the pigment is carried.

FIG. 3 is a flowchart for describing a procedure in which the automatic analyzing device 100 measures an absorbance of a solution into which a pigment is carried. Respective steps may be performed under the control by a controller 21. Hereinafter, the respective steps in FIG. 3 will be described.

FIG. 3: Steps S301 and S302

The automatic analyzing device 100 cleans the sample dispensing probe 11a after dispensing the pigment solution (S301). Next, the automatic analyzing device 100 dispenses a solution including no pigment (S302). At this time, a pigment remaining on the sample dispensing probe 11a is carried.

FIG. 3: Step S303

The automatic analyzing device 100 cleans the sample dispensing probe 11a. It is preferable that the cleaning at this time is performed more intensively, in comparison to the normal cleaning. Specifically, a method in which the cleaning is repeatedly performed in the cleaning tank 13 may be considered. Alternatively, the sample dispensing probe 11a may be intensively cleaned in the cleaning tank 42 by using the cleaning acceleration mechanism 45 after being cleaned in the cleaning tank 13.

FIG. 3: Step S304

The automatic analyzing device 100 dispenses the solution into which the pigment is carried into the reaction vessel 2 by using the intensively cleaned sample dispensing probe 11a. It may be difficult to dispense, to the reaction vessel 2, an amount of solution that is enough to perform photometry at once, depending on a dispensing amount of the sample dispensing probe 11a. In this case, the solution may be dispensed dividedly a plurality of times.

FIG. 3: Steps S305 to S307

The automatic analyzing device 100 stirs the dispensed solution by using the stirring mechanism 5 or 6 to make the solution more uniform (S305). The automatic analyzing device 100 performs photometry by using the spectrophotometer 4 to measure an absorbance (S306). The automatic analyzing device 100 calculates an amount of carried pigment by using the measured absorbance according to the procedure described in Embodiment 1 (S307).

FIG. 3: Step S305: Supplementary Description

In a case where the dispensed solution is sufficiently uniform, this step can be omitted. For example, since the same effect as that of stirring the solution is achieved by repeatedly sucking and discharging the solution into which the pigment is carried before dispensing the solution by the sample dispensing probe 11a, in this case, this step can be omitted.

Figure 4:
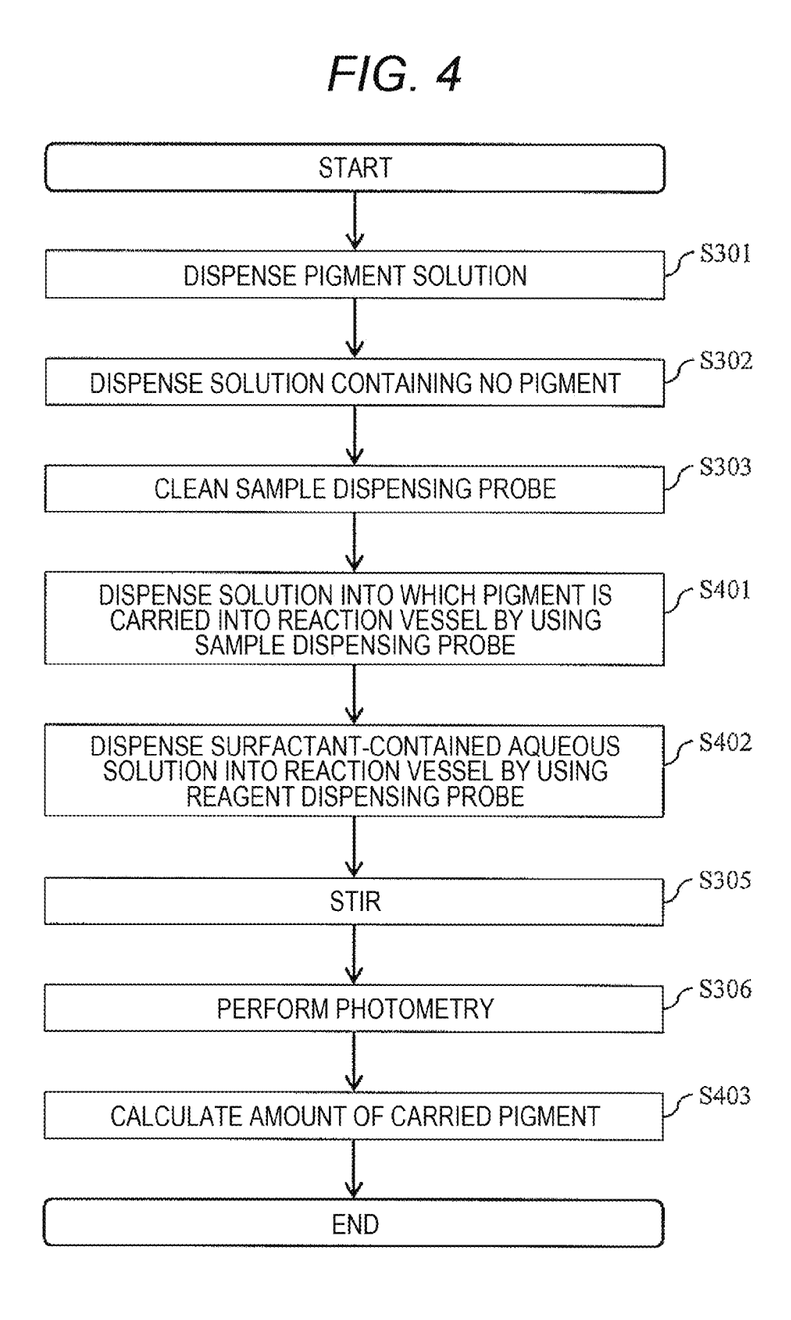
FIG. 4 is a flowchart for describing another procedure in which the automatic analyzing device 100 measures an absorbance of a solution into which the pigment is carried.

FIG. 4 is a flowchart for describing another procedure in which the automatic analyzing device 100 measures an absorbance of a solution into which a pigment is carried. Steps S301 to S303, S305, and S306 are similar to those in FIG. 3. Steps S401 and S402 are performed instead of step S304, and S403 is performed instead of step S307. Hereinafter, these steps will be described.

FIG. 4: Step S401

The automatic analyzing device 100 dispenses a solution into which a pigment is carried into the reaction vessel 2. An amount of dispensed solution need not be enough to perform photometry by the spectrophotometer 4, but only needs to be an amount at which the solution can be dispensed by the sample dispensing probe 11a at once.

FIG. 4: Step S402

The automatic analyzing device 100 dispenses a reagent into the reaction vessel 2 into which the solution into which the pigment is carried is dispensed in step S401, by using the reagent dispensing mechanism 8. This step is to increase an amount of solution by the reagent until the amount of solution reaches an amount at which the spectrophotometer 4 can perform photometry. Examples of the reagent used here include a surfactant-contained aqueous solution and the like.

FIG. 4: Step S403

Although this step is similar to S307, since the amount of solution is increased by the reagent in step S402, there is a need to multiply the amount of pigment calculated by Equation 1 by a coefficient in the following Equation 3 in order to calculate the amount of carried pigment.

Coefficient=(Amount of dispensed reagent+Amount of dispensed solution into which pigment is carried)/Amount of dispensed solution into which pigment is carried (3)

The procedure described with reference to FIGS. 3 and 4 may be provided in advance as, for example, a special operation mode of the automatic analyzing device 100, and a user may specify the special operation mode to be performed as needed.

Embodiment 4

Conventionally, it has been difficult to distinguish a factor (for example, a factor derived from a device state such as a reduction in an amount of cleaning water caused by a decrease in cleaning water pressure) other than the surface state of the dispensing probe, and a factor derived from the surface state of the sample dispensing probe 11a among the factors of increasing the amount of carried pigment. Therefore, it has been difficult to determine whether to clean the sample dispensing probe 11a or to repair the cleaning mechanism of the device. In this regard, in Embodiment 4 of the present invention, a method of determining a factor of increasing the amount of carried pigment by using a plurality of types of pigment solutions is described.

In Embodiment 4, two or more types of pigment solutions are prepared. These pigment solutions use the same pigment, and pigment concentrations are adjusted to be the same as each other. However, since concentrations of acids added to the respective solutions are different from each other, pHs of the whole solutions are different from each other. A test is performed by individually using the two or more types of pigment solutions according to the method described in Embodiment 1. A common solution, for example, a saline solution or the like can be used as the solution including no pigment.

Figure 5:
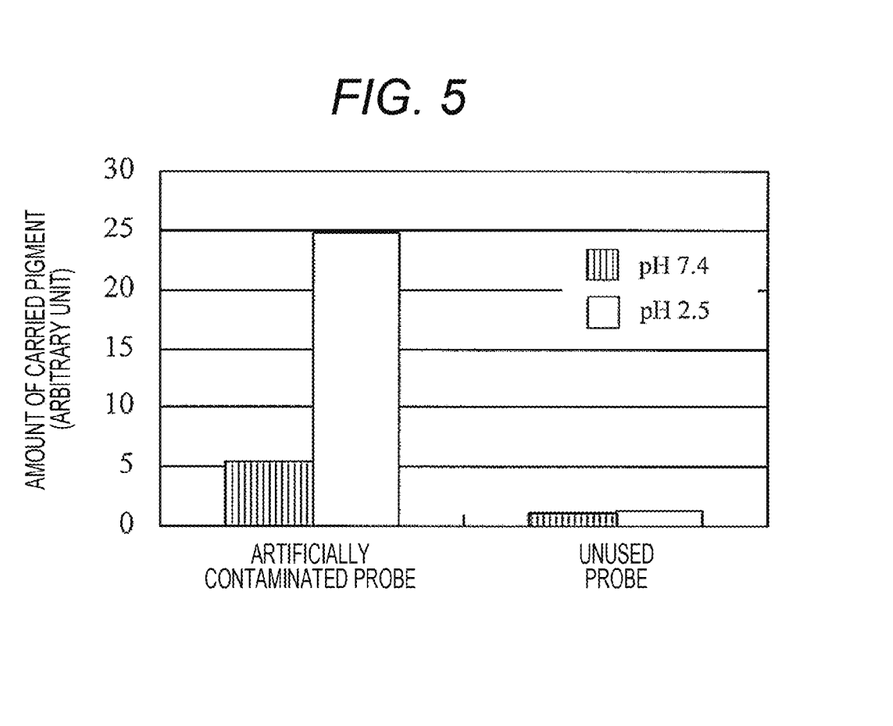
FIG. 5 illustrates a result of performing a test according to Embodiment 1 by using two types of pigment solutions.

FIG. 5 illustrates a result of performing a test according to Embodiment 1 by using two types of pigment solutions. A vertical axis is similar to that in FIG. 2. As the sample dispensing probe 11a, an unused probe and a probe artificially contaminated by drying and fixing a protein after sucking were used. Two types of pigment solutions having pHs of 2.5 and 7.4, respectively, were used. As can be seen from FIG. 5, in a case of using the artificially contaminated sample dispensing probe 11a, a tendency that a difference in an amount of carried pigment caused depending on a pH of the pigment solution is significant appears. Whereas, in a case of using the unused sample dispensing probe 11a, a difference caused by the amount of carried pigment is insignificant.

Figure 6:
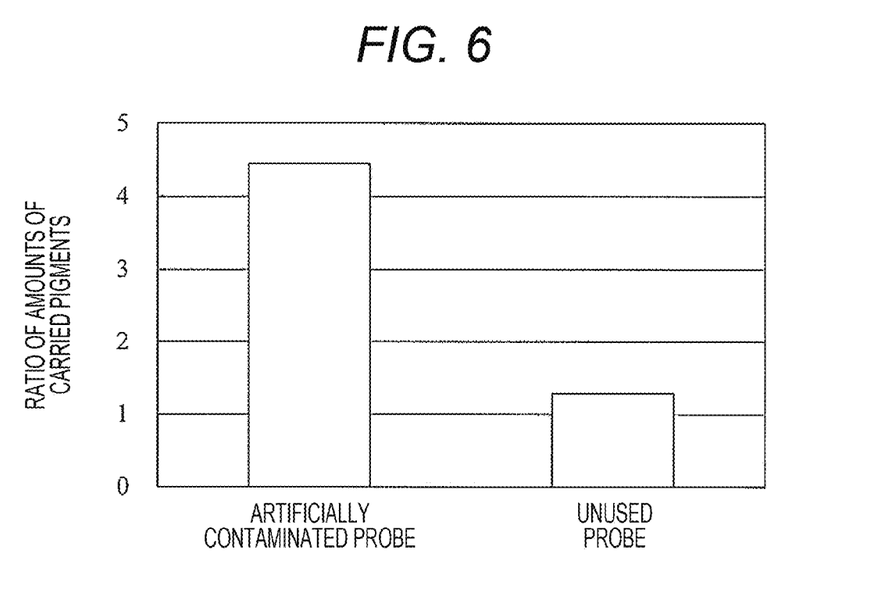
FIG. 6 illustrates a ratio of amounts of pigments, respectively, carried from the two types of pigment solutions illustrated in FIG. 5.

FIG. 6 illustrates a ratio of amounts of pigments, respectively, carried from the two types of pigment solutions illustrated in FIG. 5. (An amount of carried pigment in a case where the pH of the pigment solution is 2.5)/(an amount of carried pigment in a case where the pH of the pigment solution is 7.4) was calculated for the two sample dispensing probes 11a. As can be seen from FIG. 6, in a case of the artificially contaminated sample dispensing probe 11a, a tendency that a difference in an amount of carried pigment caused depending on a pH of the pigment solution is significant appears.

It may be considered that a mechanism in which the pigment is carried is largely divided into two types. In the first type of mechanism, the pigment is adsorbed onto the surface of the sample dispensing probe 11a and the pigment is detached from the surface and carried when the solution including no pigment is dispensed (surface adsorption). In this mechanism, it may be considered that the amount of carried pigment varies depending on a change of the surface state of the sample dispensing probe 11a. In the second type of mechanism, the pigment solution remains as a liquid due to an insufficient amount of cleaning water, or the like (remaining the solution). In this mechanism, it may be considered that the amount of carried pigment varies depending on a cleaning condition such as a degree of easiness of cleaning away the solution (viscosity) or a change in cleaning water pressure. These differences are used to identify the factors of increasing the amount of carried pigment.

In a case of changing only the pH of the pigment solution, generally, properties of the solution such as viscosity do not largely change. Further, it may be considered that the cleaning condition such as a cleaning water pressure is maintained constant, because the evaluation is performed in the same device. Accordingly, it is estimated that the surface adsorption is a main factor of causing the difference in the amount of carried pigment caused depending on a pH of the pigment solution. Therefore, in a case where the amount of carried pigment varies depending on the change in the pH of the pigment solution, it is estimated that surface contamination of the sample dispensing probe 11a is the cause. As a countermeasure, cleaning the sample dispensing probe 11a in the cleaning tank 42 may be considered.

In a case where the amount of pigment does not largely vary even when the pH of the pigment solution is changed, but all the amounts of carried pigments are increased, it is estimated that the amount of carried pigment is increased due to a failure of the device, such as a reduction in an amount of cleaning water. As a countermeasure, repairing the cleaning mechanism, replacing the automatic analyzing device 100, or the like may be considered.

As described above, it is possible to distinguish factors of increasing the amount of pigment by detecting the difference in the amount of carried pigment between the respective pigment solutions by using two or more types of pigment solutions having pHs different from each other.

Figure 7:
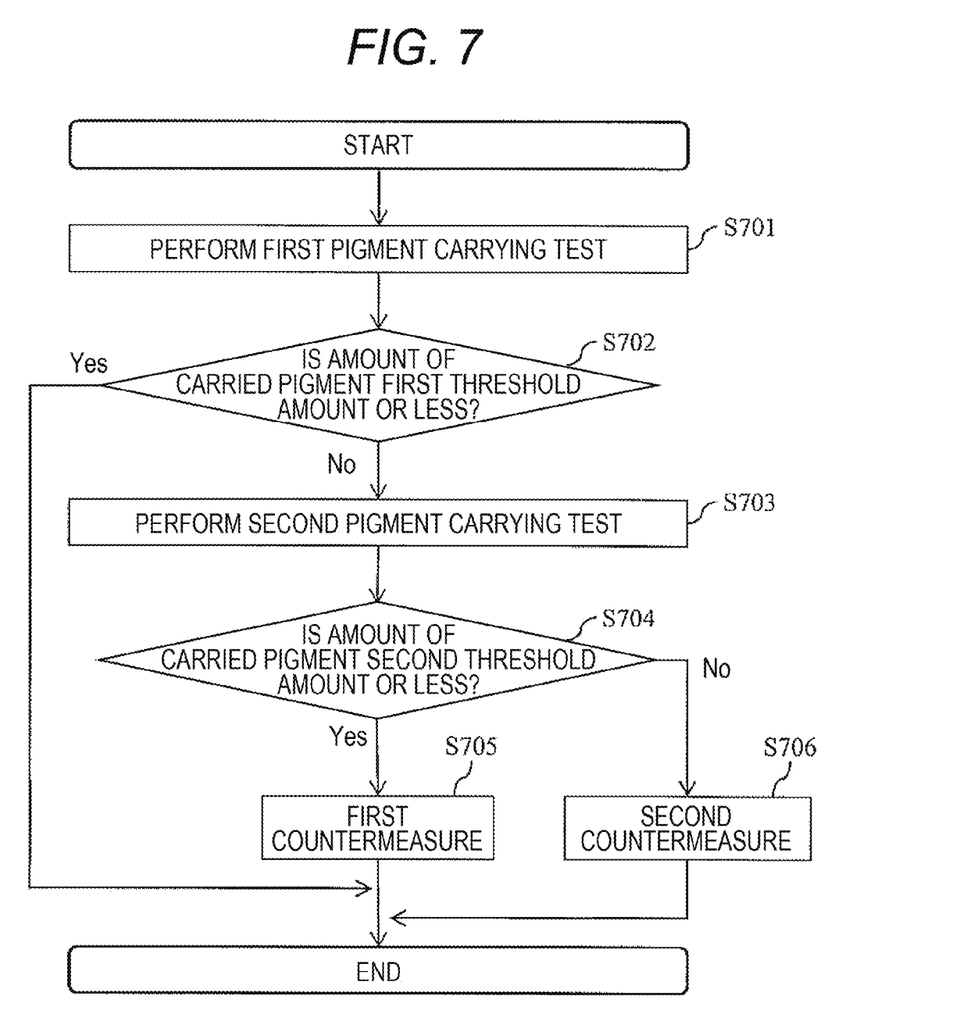
FIG. 7 is a flowchart for describing a procedure in which a contamination factor is identified by using a difference in the amount of carried pigment, caused depending on a pH.

FIG. 7 is a flowchart for describing a procedure in which a contamination factor is identified by using a difference in an amount of carried pigment, caused depending on a pH. Respective steps may be performed under the control by a controller 21. Hereinafter, the respective steps in FIG. 7 will be described.

FIG. 7: Steps S701 and S702

The automatic analyzing device 100 performs a pigment carrying test similar to that according to Embodiment 1 by using a pigment solution having a low pH (for example, a pH of 2.5) (S701). The automatic analyzing device 100 determines whether or not an amount of carried pigment in step S701 is a first threshold amount or less (S702). In a case where the amount of carried pigment is the first threshold amount or less, which means that the surface state of the sample dispensing probe 11*a* is clean and a cleaning capability does not deteriorate, a determination result indicating such a fact is stored or the like in a storage device included in the controller 21 to end this flowchart. In a case where the amount of carried pigment exceeds the first threshold amount, the flow proceeds to step S703.

FIG. 7: Steps S703 and S704

The automatic analyzing device 100 performs a pigment carrying test similar to that according to Embodiment 1 by using a pigment solution having a high pH (for example, a pH of 7.4) (S703). The automatic analyzing device 100 determines whether or not an amount of carried pigment in step S703 is a second threshold amount or less (S704). In a case where the amount of carried pigment is the second threshold amount or less, the flow proceeds to step S705, and in a case where the amount of carried pigment exceeds the second threshold amount or less, the flow proceeds to step S706.

FIG. 7: Step S705

In a case where the amount of carried pigment is the second threshold amount or less in step S704, it is considered that the amount of carried pigment is increased due to step S701. Therefore, the automatic analyzing device 100 performs cleaning of the sample dispensing probe 11*a* as a countermeasure.

FIG. 7: Step S706

In a case where the amount of carried pigment exceeds the second threshold amount or less in step S704, it is considered that the amount of carried pigment is increased due to steps S701 and S703. Therefore, the automatic analyzing device 100 performs cleaning of the surface of the sample dispensing probe 11*a* and outputs a determination result indicating that the cleaning mechanism fails as a countermeasure. For example, data indicating such a fact can be written in the storage device included in the controller 21.

Figure 8:
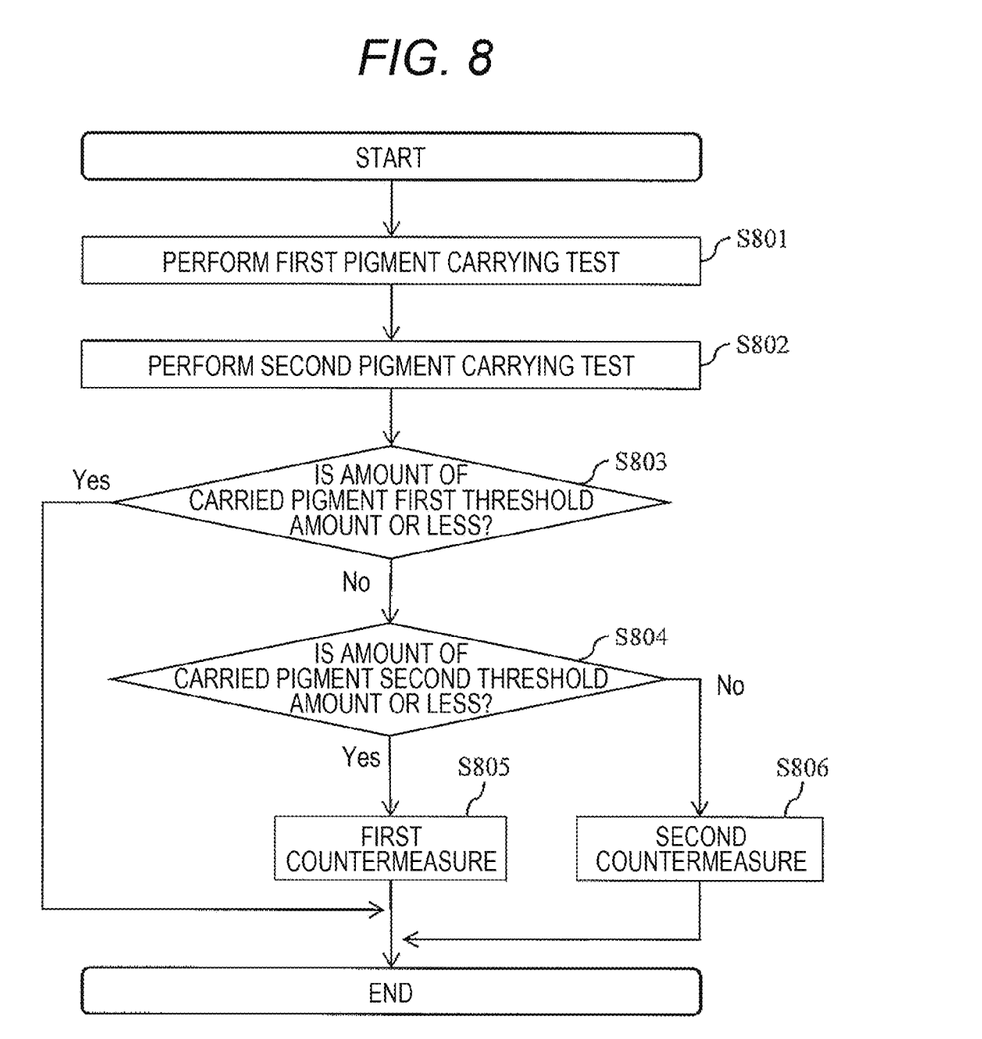
FIG. 8 is a flowchart for describing another procedure in which a contamination factor is identified by using a difference in the amount of carried pigment, caused depending on a pH.

FIG. 8 is a flowchart for describing another procedure in which a contamination factor is identified by using a difference in an amount of carried pigment, caused depending on a pH. In FIG. 8, tests corresponding to steps S701 and S703 described with reference to FIG. 7 are completed in advance, and a result thereof is stored in the controller 21 or the like. A determination standard is similar to that in FIG. 7.

Embodiment 5

In Embodiments described above, the amount of dispensed pigment solution is constant (for example, 10 µL). In Embodiment 5 of present invention, a method of performing a more detailed evaluation of the surface state of the sample dispensing probe 11*a* by performing a similar test in a manner in which the sample dispensing probe 11*a* is only immersed into the pigment solution without sucking the pigment solution will be described.

Figure 9:
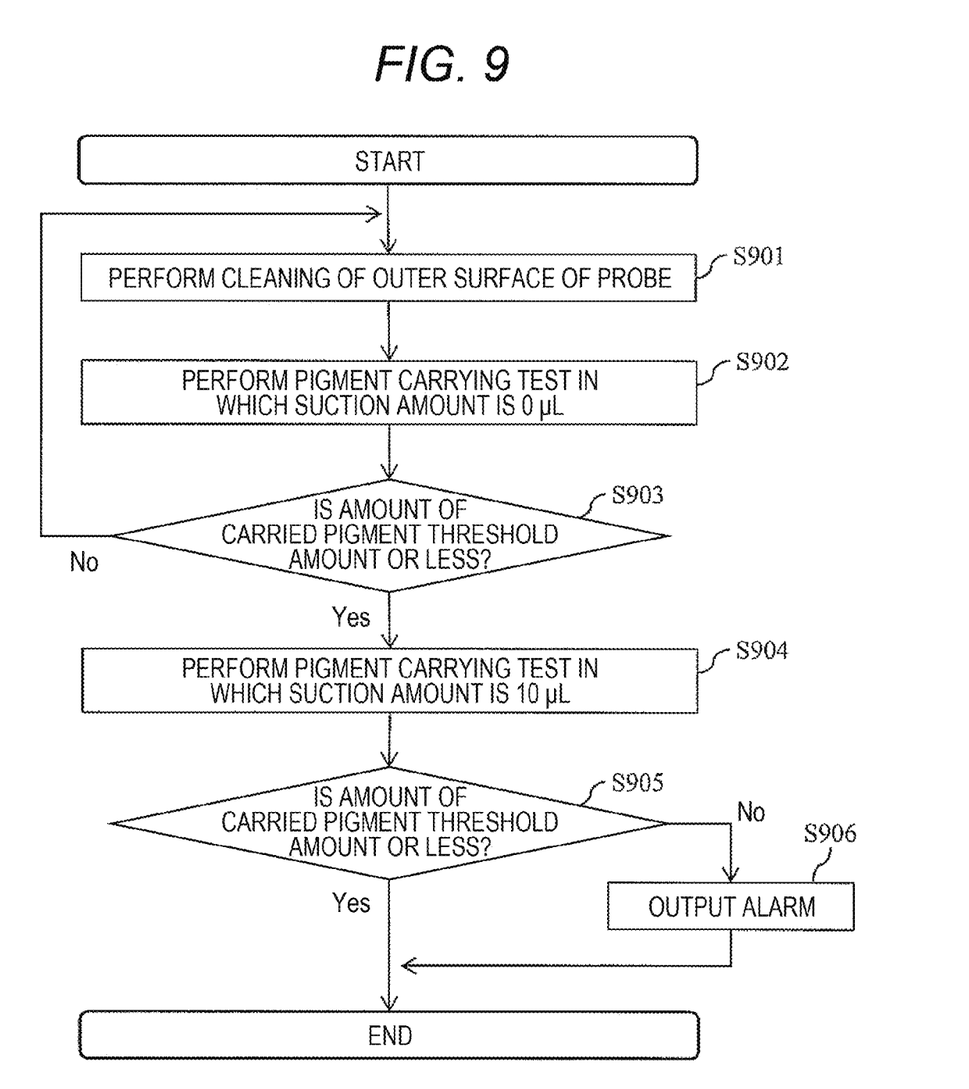
FIG. 9 is a flowchart for describing a procedure in which an inner surface state and an outer surface state of a sample dispensing probe 11a are checked.

FIG. 9 is a flowchart for describing a procedure in which an inner surface state and an outer surface state of the sample dispensing probe 11*a* are checked. Respective steps may be performed under the control by a controller 21. Hereinafter, the respective steps in FIG. 9 will be described.

FIG. 9: Step S901

An operator wipes and cleans an outer surface of the sample dispensing probe 11*a* by using, for example, a gauze soaked with ethanol. In addition, a method capable of intensively cleaning the outer surface, such as ultrasonic cleaning or the like, may also be used. In a case of using a method other than manual cleaning, automatic cleaning can be performed by the controller 21.

FIG. 9: Step S902

The automatic analyzing device 100 performs a pigment carrying test, in which both of an amount of dispensed pigment solution and an amount of dispensed solution including no pigment are 0 µL, according to the method described in Embodiment 1. Specifically, the sample dispensing probe 11*a* is immersed in a solution and then is lifted as it is without sucking the solution. By doing so, only the outer surface of the sample dispensing probe 11*a* is brought into contact with the solution. Therefore, it is possible to identify a cleanliness of the outer surface.

FIG. 9: Step S903

The automatic analyzing device 100 checks whether or not an amount of carried pigment is a threshold amount or less. In a case where the amount of carried pigment is the threshold amount or less, it is determined that the outer surface is clean, and data indicating such a fact are stored in the storage device of the controller 21. In a case where the amount of carried pigment exceeds the threshold amount, data indicating such a fact are stored in the storage device of the controller 21, and the flow returns to step S901 to repeat the similar process. By doing so, it is possible to surely keep the outer surface clean.

FIG. 9: Step S904

The automatic analyzing device 100 performs a pigment carrying test, in which both of the amount of dispensed pigment solution and the amount of dispensed solution including no pigment are 10 µL, according to the method described in Embodiment 1. By doing so, an inner surface of the sample dispensing probe 11*a* is brought into contact with the solution. Therefore, it is possible to identify a cleanliness of the inner surface. Since it is already confirmed that the outer surface is clean, a purpose of this step is to check the cleanliness of the inner surface.

FIG. 9: Step S905

The automatic analyzing device 100 checks whether or not an amount of carried pigment is a threshold amount or less. It is preferable to use a threshold amount different from that in step S903. In a case where an amount of carried pigment is the threshold amount or less, this flowchart ends. In a case where the amount of carried pigment exceeds the threshold amount, the flow proceeds to step S906.

FIG. 9: Step S906

The automatic analyzing device 100 outputs an alarm indicating that the inner surface of the sample dispensing probe 11a is not clean. For example, data indicating such a fact may be stored in the storage device of the controller 21, or an external output such as a display on a screen, a notification sound, or the like may be used. By doing so, the user is urged to take an action such as replacing the sample dispensing probe 11a, or the like.

Embodiment 6

At the time of dispensing a pigment solution, as a depth to which the sample dispensing probe 11a is allowed to enter the pigment solution or a solution including no pigment, a range in which the outer surface is brought into contact with the solution is changed. By using such a fact, it is possible to estimate which portion of the outer surface is not clean. A procedure therefor will be described in Embodiment 6 of the present invention.

The automatic analyzing device 100 allows the sample dispensing probe 11a to enter each solution to a depth of 1 mm. By doing so, the outer surface of the sample dispensing probe 11a is brought into contact with each solution within a range of 1 mm from a distal end. The automatic analyzing device 100 performs a test without sucking the solution similarly to steps S902 and S903 in FIG. 9. The pigment carrying test is performed similarly while changing the depth to which the sample dispensing probe 11a is allowed to enter the solution to 2 mm/3 mm/4 mm, and the like.

The automatic analyzing device 100 can store data indicating that a portion of the outer surface that is brought into contact with the solution is not clean in the storage device of the controller 21 when the amount of carried pigment exceeds the threshold amount. The user can grasp the portion of the outer surface to be cleaned according to an output thereof, and take a countermeasure such as cleaning the portion, or the like.

Embodiment 7

Figure 10:
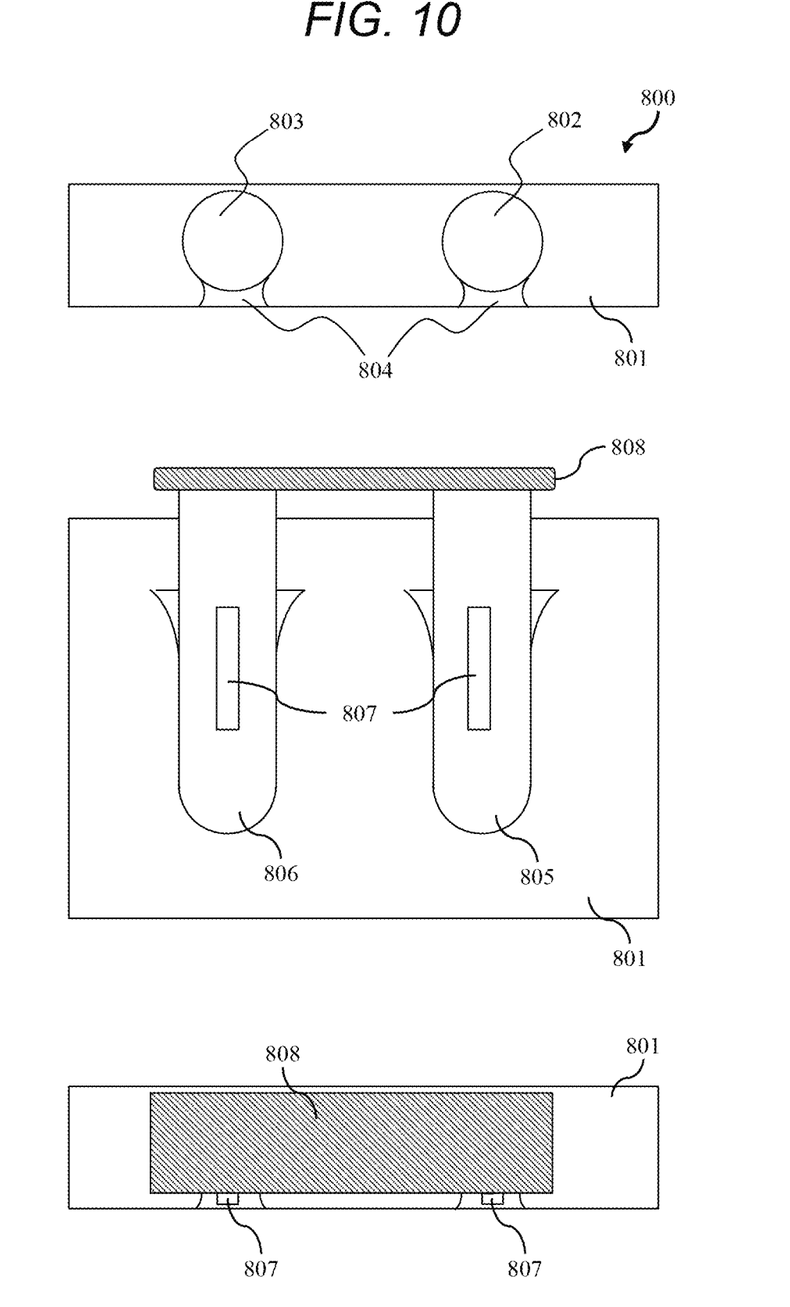

FIG. 10 is a view illustrating a configuration of a test kit 800 containing a solution or the like used to test a cleanliness of the sample dispensing probe 11a. The upper side of FIG. 10 shows a top view of the test kit 800. A rack 801 is configured to be able to be placed on the sample conveying mechanism 17 of the automatic analyzing device 100. Container mounting portions 802 and 803 are cavities each in which a container containing a test solution is mounted. Opened portions 804 communicating with the container mounting portions 802 and 803, respectively, are formed at portions of a side wall of the rack 801. For example, a side where the opened portion 804 is formed can be recognized as a front surface of the test kit 800.

The middle side of FIG. 10 shows a front view of the test kit 800. A container 805 containing a pigment solution is mounted in the container mounting portion 802, and a container 806 containing a solution including no pigment is mounted in the container mounting portion 803. The containers 805 and 806 each have a protruding portion 807, and are configured so that a position of the protruding portion 807 corresponds to a position of the opened portion 804 when the containers 805 and 806 are mounted. Opening portions of the respective containers are sealed with a seal 808. The opening operations of the respective containers are connected to each other by the seal 808 and as a result, the containers 805 and 806 are integrally mounted in the rack 801. Therefore, it is possible to lower the possibility of the operator being confused about the pigment solution and the solution including no pigment. The lower side of FIG. 10 shows a top view illustrating a state in which the seal 808 is attached.

Embodiment 8

Conventionally, a biochemistry-related item such as sugars, a lipid, or the like, and an immune-related item such as a tumor marker, a hormone, or the like have been measured by using different devices. In recent years, a composite automatic analyzing device in which these devices are combined has been used. In such a composite automatic analyzing device, two sample dispensing systems may be used. In a first dispensing system, one sample dispensing probe is repeatedly used while being cleaned. In a second dispensing system, a disposable sample dispensing probe is used and the dispensing probe is replaced for each sample.

By using two dispensing systems as described above, it is possible to avoid contamination (carryover) of the sample at the time of dispensing the sample. The carryover means that in a case where the same sample dispensing probe is repeatedly used to dispense the sample, an extremely small amount of sample components remaining on a surface of the sample dispensing probe is carried over to a sample to be subsequently dispensed. Such a carry-over of the extremely small amount of sample components may affect an immunoassay which requires a high sensitivity. Therefore, the second dispensing system using the disposable sample dispensing probe is used for the immunoassay-related item which requires a high sensitivity. The first dispensing system repeatedly using the same sample dispensing probe is used for other items. In the first dispensing system, a high-speed dispensing is possible because the dispensing probe need not be detached, or the like. It is possible to avoid the carry-over and rapidly perform the analysis by properly using the dispensing systems.

In a case of using the automatic analyzing device including two dispensing systems, it is possible to change a setting for avoiding the carry-over according to an analysis item. For example, a carry-over avoidance level is set to "high" and the second dispensing system is used for the immunoassay-related item which requires a high sensitivity, such as a hormone, a tumor marker, or the like. In a case where a high-sensitivity analysis is not required, the first dispensing system is used.

The amount of carried pigment measured according to the method described in Embodiment 1 can be associated with the carry-over avoidance level. For example, it is assumed that there are three analysis items of A/B/C, and required analysis sensitivities (=carry-over avoidance levels) of the analysis items of A/B/C were higher in this order. When the amount of carried pigment is small, the first dispensing system is used for all the analysis items. When the amount of carried pigment is moderate, the second dispensing system is used for the analysis item A, and the first dispensing system is used for the analysis items B and C. When the amount of carried pigment is large, the second dispensing system is used for the analysis items A and B, and the first dispensing system is used for the analysis item C.

In a case where there is only one dispensing system, enhancing an effectiveness of the cleaning can be considered, instead of using a disposable tip. For example, in the example of the analysis items A/B/C, when the amount of carried pigment is small, the general cleaning tank 13 is used for all the analysis items. When the amount of carried pigment is moderate, the cleaning tank 42 including the cleaning acceleration mechanism 45 is used for the analysis item A, and the cleaning tank 13 is used for the analysis items B and C. When the amount of carried pigment is large, the cleaning tank 42 is used for the analysis items A and B, and the cleaning tank 13 is used for the analysis item C.

A correspondence relationship among the analysis item/the carry-over avoidance level/the amount of carried pigment can be, for example, specified by the user, or data describing a definition therefor may be stored in the controller 21 in advance and used.

In the above description, it is described that the sample dispensing probe 11a is kept cleaner when the amount of carried pigment is large. Similarly, a replacement time of the sample dispensing probe 11a can be determined according to the amount of carried pigment. For example, it may be considered that the automatic analyzing device 100 determines that (a) the sample dispensing probe 11a is usable for six months when the amount of carried pigment is small, that (b) the sample dispensing probe 11a needs to be replaced within one month when the amount of carried pigment is moderate, and that (c) the sample dispensing probe 11a needs to be immediately replaced when the amount of carried pigment is large.

Modified Examples of Present Invention

The present invention is not limited to Embodiments described above, but includes various modified examples. For example, Embodiments described above have been described in detail in order to explain the present invention in an easy-to-understand manner, and the present invention is not necessarily limited to those having all the configurations described. Further, part of a configuration of one embodiment can be replaced with a configuration of another embodiment, and the configuration of another embodiment can be added to the configuration of the one embodiment. In addition, with respect to part of the configuration of each embodiment, it is possible to add, delete, and replace other configurations.

In Embodiments described above, in a case where the amount of carried pigment exceeds the threshold amount as a result of the pigment carrying test, the controller 21 may output such a fact to urge maintenance or replacement of the sample dispensing probe 11a. Examples of a form of the output may include storing data indicating the fact in the storage device included in the controller 21, a display on a screen, and the like. Further, a test result may be transmitted from the automatic analyzing device 100 to a server computer, such that the server computer determines whether or not the maintenance or the like is needed.

In Embodiments described above, in a case where a plurality of automatic analyzing devices 100 each including the sample dispensing probe 11a are combined to form one analyzing device, an absorbance of a solution into which a pigment is carried can be measured by a spectrophotometer 4 of any one automatic analyzing device.

In Embodiments described above, a case of evaluating a surface state of the sample dispensing probe 11a is described, but the present invention may also be applied to other dispensing probes (for example, a reagent dispensing probe).

REFERENCE SIGNS LIST 3 cleaning mechanism
4 spectrophotometer
5 stirring mechanism
6 stirring mechanism
7 sample dispensing mechanism
8 sample dispensing mechanism
9 reagent disk
10 reagent bottle
11 sample dispensing mechanism
11a sample dispensing probe
13 cleaning tank
14 cleaning tank
15 sample container
16 rack
17 sample conveying mechanism
18 reagent syringe
19 sample syringe
20 cleaning pump
21 controller
30 cleaning tank
31 cleaning tank
32 cleaning tank
33 cleaning tank
36 pump
40 pressure sensor
41 thermostat
42 cleaning tank
43 cleaning fluid tank
44 cleaning fluid syringe
45 cleaning acceleration mechanism
46 cleaning fluid
100 automatic analyzing device
800 test kit
801 rack
802 container mounting portion
803 container mounting portion
804 opened portion
805 container
806 container
807 protruding portion
808 seal

The invention claimed is:

1. A test method for evaluating a surface state of a dispensing probe included in a dispensing device that dispenses a liquid sample, the test method comprising:
   a step of dispensing a first test solution in which an acidic pigment is dissolved;
   a step of cleaning the dispensing probe;
   a step of dispensing a second test solution in which no acidic pigment is dissolved;
   a step of acquiring an absorbance of the first test solution on a spectrophotometer;

a step of acquiring an absorbance of the second test solution on the spectrophotometer before the acidic pigment is carried;

a step of acquiring an absorbance of the second test solution on the spectrophotometer after the acidic pigment is carried; and a step of cleaning a surface of the dispensing probe if a calculated amount of the acidic pigment that is carried into the second test solution exceeds a predetermined threshold amount;

wherein the first test solution has a pH of 2.0 or more and 4.4 or less;

wherein the calculated amount of the acidic pigment that is carried into the second test solution is calculated by subtracting the absorbance of the second test solution before the acidic pigment is carried from the absorbance of the second test solution after the acidic pigment is carried to provide a difference, and dividing the difference by a product, the product calculated by multiplying a second difference by a concentration of the first test solution by a volume of the first test solution, the second difference calculated by subtracting the absorbance of the second test solution before the acidic pigment is carried from the absorbance of the first test solution.

2. The test method according to claim 1,
wherein in the step of acquiring an absorbance of the second test solution on the spectrophotometer after the acidic pigment is carried, the absorbance of the second test solution is acquired by using an external spectrophotometer instead of a photometer included in the dispensing device.

3. The test method according to claim 1,
wherein in the step of acquiring an absorbance of the second test solution on the spectrophotometer after the acidic pigment is carried, the absorbance of the second test solution is acquired by using a spectrophotometer included in the dispensing device.

4. The test method according to claim 1, further comprising:
a step of dispensing a third test solution having a pH different from the pH of the first test solution and in which the acidic pigment is dissolved;
a step of cleaning the dispensing probe;
a step of dispensing the second test solution into which the acidic pigment is not dissolved;
a step of acquiring an absorbance of the third test solution on the spectrophotometer;
a step of acquiring an absorbance of the second test solution on the spectrophotometer after the acidic pigment is carried from one of the first test solution and the third test solution; and
a step of cleaning the dispensing probe if (1) the acidic pigment is carried from the third test solution, (2) the third test solution has a higher pH than the pH of the first test solution, and (3) a calculated amount of the acidic pigment that is carried from the first or third test solution into the second test solution is less than a second predetermined threshold amount; and
a step of cleaning the surface of the dispensing probe if (1) the acidic pigment is carried from the third test solution, (2) the third test solution has a higher pH than the pH of the first test solution, and (3) the calculated amount of the acidic pigment that is carried from the first or third test solution into the second test solution exceeds the second predetermined threshold amount; and wherein the calculated amount of the acidic pigment that is carried from the first or third test solution into the second test solution is calculated by subtracting the absorbance of the second test solution before the acidic pigment is carried from the absorbance of the second test solution after the acidic pigment is carried to provide a difference, and dividing the difference by a second product, the second product calculated by multiplying a third difference by a concentration of the first test solution or the third test solution by a volume of the second test solution, the third difference calculated by subtracting the absorbance of the second test solution before the acidic pigment is carried from the absorbance of the first test solution or the third test solution.

5. The test method according to claim 1, further comprising:
a step of immersing the dispensing probe in the first test solution and then lifting the dispensing probe from the first test solution without sucking the first test solution so as to make the acidic pigment be attached onto an outer surface of the dispensing probe and at least partially be carried into the second test solution as the calculated amount of the acidic pigment carried into the second test solution;
a step of indicating that the outer surface is clean if the calculated amount of the acidic pigment carried into the second test solution is below a second predetermined threshold amount; and
a step of indicating that the outer surface is not clean if the calculated amount of the acidic pigment carried into the second test solution is above the second predetermined threshold amount.

6. The test method according to claim 1,
wherein in the step of dispensing the first test solution, the dispensing probe is allowed to enter the first test solution to a first depth to suck the first test solution,
in the step of dispensing the second test solution, the dispensing probe is allowed to enter the second test solution to the first depth to suck the second test solution,
the test method further comprising:
a step of allowing the dispensing probe to enter the first test solution to a second depth different from the first depth to suck the first test solution;
a step of dispensing the first test solution;
a step of cleaning the dispensing probe;
a step of allowing the dispensing probe to enter the second test solution in which no acidic pigment is dissolved to the second depth to suck the second test solution;
a step of dispensing the second test solution in which no acidic pigment is dissolved;
a step of cleaning a portion of the surface of the dispensing probe corresponding to the first depth if the calculated amount of the acidic pigment that is carried into the second test solution exceeds a second predetermined threshold amount; and
a step of cleaning a second portion of the surface of the dispensing probe corresponding to the second depth if the calculated amount of the acidic pigment that is carried into the second test solution exceeds the fourth second predetermined threshold amount.

7. The test method according to claim 1,
wherein the dispensing device comprises a first dispensing probe repeatedly used by being cleaned between uses, and a disposable second dispensing probe, the test method further comprising a dispensing probe determining step of using the first dispensing probe for a first sample and the second dispensing probe for a second sample different from the first sample if the calculated amount of the acidic pigment that is carried into the second test solution by the first dispensing probe is at or above a second predetermined threshold amount, and using the second dispensing probe for both of the first sample and the second sample when the calculated amount of the acidic pigment that is carried into the second test solution by the first dispensing probe is below the second predetermined threshold amount.

8. The test method according to claim 1, further comprising a step of, if the calculated amount of acidic pigment that is carried into the second test solution exceeds a second predetermined threshold amount, indicating that the calculated amount of acidic pigment that is carried into the second test solution exceeds the predetermined threshold amount.

9. The test method according to claim 1, wherein the acidic pigment is any one of orange G, eosin Y, light green, and amido black.

10. The dispensing device comprising a controller which executes the test method according to claim 1.

* * * * *